US012237135B2

(12) United States Patent
Hoepfl et al.

(10) Patent No.: US 12,237,135 B2
(45) Date of Patent: Feb. 25, 2025

(54) VACUUM INTERRUPTER

(71) Applicant: Maschinenfabrik Reinhausen GmbH, Regensburg (DE)

(72) Inventors: Klaus Hoepfl, Maxhuette-Haidhof (DE); Silke Wrede, Zeitlarn (DE); Markus Zintl, Mitterteich (DE); Anniyappan Palani, Regensburg (DE)

(73) Assignee: MASCHINENFABRIK REINHAUSEN GMBH, Regensburg (DE)

(*) Notice: Subject to any disclaimer, the term of this patent is extended or adjusted under 35 U.S.C. 154(b) by 175 days.

(21) Appl. No.: 18/002,489

(22) PCT Filed: Jun. 15, 2021

(86) PCT No.: PCT/EP2021/066010

§ 371 (c)(1),
(2) Date: Dec. 20, 2022

(87) PCT Pub. No.: WO2022/008175

PCT Pub. Date: Jan. 13, 2022

(65) Prior Publication Data

US 2024/0029967 A1 Jan. 25, 2024

(30) Foreign Application Priority Data

Jul. 6, 2020 (DE) ..................... 10 2020 117 769.0

(51) Int. Cl.
*H01H 9/00* (2006.01)
*H01H 33/662* (2006.01)

(52) U.S. Cl.
CPC .... *H01H 9/0038* (2013.01); *H01H 33/66261* (2013.01); *H01H 2033/66276* (2013.01)

(58) Field of Classification Search
CPC ............... H01H 9/0038; H01H 9/0016; H01H 9/0027; H01H 33/66261;
(Continued)

(56) References Cited

U.S. PATENT DOCUMENTS 4,081,741 A * 3/1978 Palmer .................... H01F 29/04 323/340
4,618,749 A 10/1986 Boehme et al.
(Continued)

FOREIGN PATENT DOCUMENTS

DE 3329212 A1 2/1985
DE 226690 A1 8/1985
(Continued)

OTHER PUBLICATIONS

Translation of DE19518533 (Original document published Nov. 21, 1996) (Year: 1996).*

*Primary Examiner* — William A Bolton
(74) *Attorney, Agent, or Firm* — LEYDIG, VOIT & MAYER, LTD.

(57) ABSTRACT

A vacuum interrupter arrangement may be used in a tap changer. The vacuum interrupter arrangement has a vacuum interrupter; a metal shield configured to shield against external magnetic fields, the metal shield having a hollow cylindrical design and being arranged around at least a part of a cylindrical outer surface of the vacuum interrupter; and a holder, which is arranged on the outside of the metal shield and the vacuum interrupter, and which surrounds the metal shield and the vacuum interrupter at least partially coaxially. The holder has a plurality of holding elements which hold the metal shield in position relative to the vacuum interrupter.

10 Claims, 4 Drawing Sheets

(58) Field of Classification Search
CPC ............ H01H 2033/66276; H01H 2033/6623; H01H 2033/66242; H01F 29/04
USPC .............. 218/138, 134, 136, 137; 200/11 TC
See application file for complete search history.

(56) References Cited

U.S. PATENT DOCUMENTS

| | | | | |
|---|---|---|---|---|
| 5,107,200 | A * | 4/1992 | Dohnal | H01F 29/04 323/341 |
| 5,191,179 | A * | 3/1993 | Yatchum | H01H 9/0027 200/18 |
| 5,834,717 | A | 11/1998 | Neumeyer et al. | |
| 8,686,302 | B2 * | 4/2014 | Brasher | H01H 3/44 200/5 B |
| 10,102,990 | B2 * | 10/2018 | Wrede | H01H 9/0027 |
| 2016/0141120 | A1 * | 5/2016 | Hoepfl | H01H 9/0005 200/11 TC |
| 2021/0118630 | A1 * | 4/2021 | Herold | H01H 9/0038 |

FOREIGN PATENT DOCUMENTS

| | | | |
|---|---|---|---|
| DE | 19518533 | A1 | 11/1996 |
| WO | WO 9630922 | A1 | 10/1996 |

* cited by examiner

VACUUM INTERRUPTER

CROSS REFERENCE TO RELATED APPLICATIONS

This application is a U.S. National Phase application under 35 U.S.C. § 371 of International Application No. PCT/EP2021/066010, filed on Jun. 15, 2021, and claims benefit to German Patent Application No. DE 10 2020 117 769.0, filed on Jul. 6, 2020. The International Application was published in German on Jan. 13, 2022 as WO 2022/008175 A1 under PCT Article 21(2).

FIELD

The present disclosure relates to a vacuum interrupter for a tap changer for switching between different taps of a transformer, and to a tap changer having such a vacuum interrupter.

BACKGROUND

The use of vacuum interrupters as switching elements in tap changers, in particular on-load tap changers, for uninterruptedly switching under load between winding taps of a multi-tap transformer has been known from the prior art for decades, for example from WO9630922A1.

Vacuum interrupters generally exist in the field of high-voltage engineering in a wide range of forms and areas of application, for example in circuit breakers.

Circuit breakers are known in which, depending on the strength of the current, an external influence on the vacuum interrupter can occur from a magnetic field. A shield by means of which the vacuum interrupter is protected from this action by external magnetic fields is proposed in DE19518533A1.

Such a magnetic field can be generated by a transformer, depending on its specification and design, and consequently can also have an influence on the vacuum interrupters of a tap changer. This external influence, as recognized by the present inventors, can negatively influence the lifetime of the vacuum interrupters because asymmetrical wear of the contacts and asymmetrical vapor deposition of the insulating sections in the vacuum interrupters can occur.

SUMMARY

In an embodiment, the present disclosure provides a vacuum interrupter arrangement that may be used in a tap changer. The vacuum interrupter arrangement has a vacuum interrupter; a metal shield configured to shield against external magnetic fields, the metal shield having a hollow cylindrical design and being arranged around at least a part of a cylindrical outer surface of the vacuum interrupter; and a holder, which is arranged on the outside of the metal shield and the vacuum interrupter, and which surrounds the metal shield and the vacuum interrupter at least partially coaxially. The holder has a plurality of holding elements which hold the metal shield in position relative to the vacuum interrupter.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
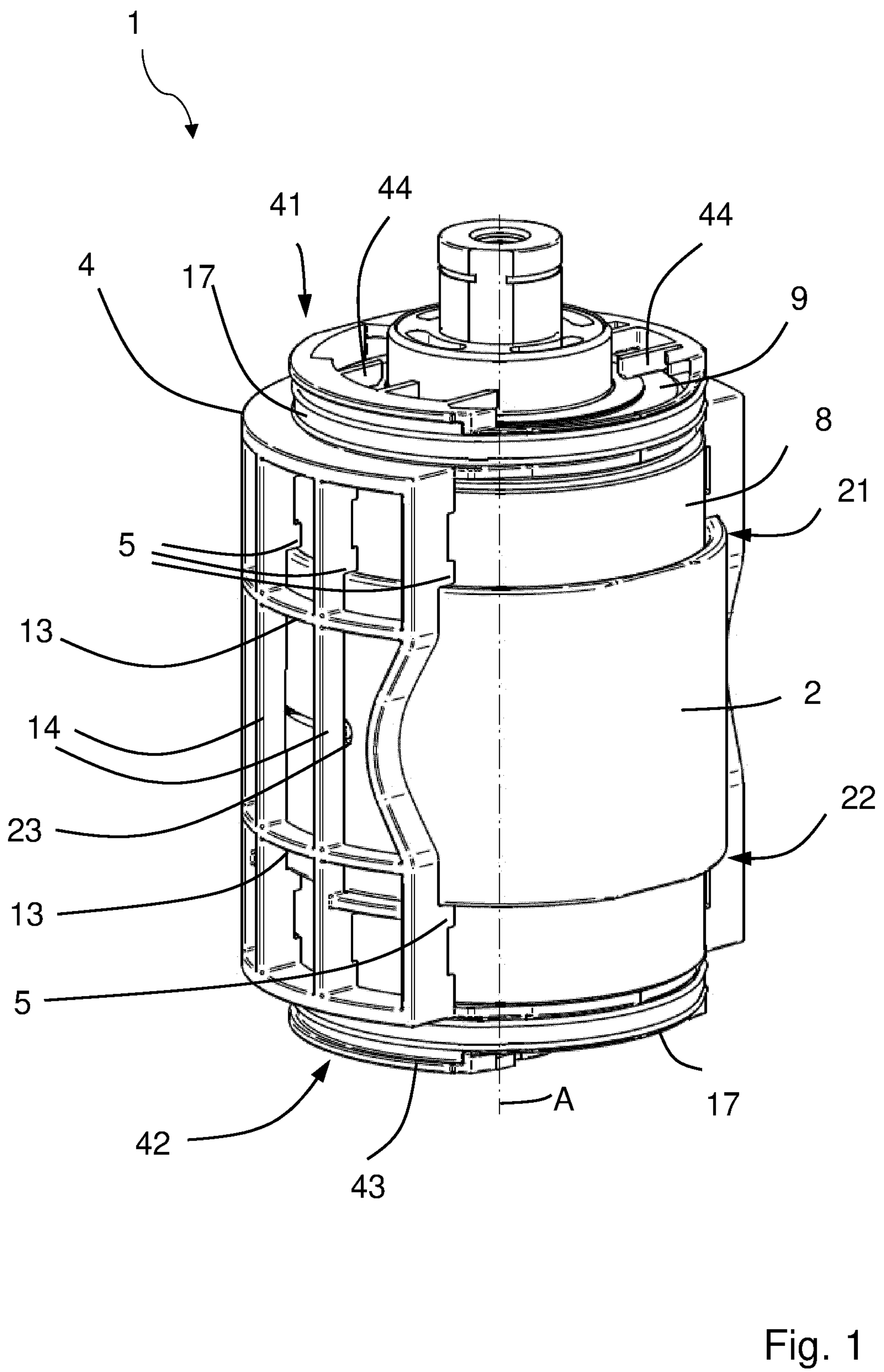
FIG. 1 shows a perspective illustration of an exemplary embodiment of a vacuum interrupter according to the improved concept.

Aspects of the present disclosure provide an improved concept for a vacuum interrupter by means of which the vacuum interrupter is shielded from the disruptive influence of a surrounding external magnetic field and safe operation of the tap changer is ensured.

Aspects of the present disclosure are based on the idea of equipping the vacuum interrupter with a metal shield against external magnetic fields.

According to one aspect, a vacuum interrupter for a tap changer is provided which comprises a metal shield against external magnetic fields and a holder.

The metal shield has a hollow cylindrical design and is arranged at least around a part of a cylindrical outer surface of the vacuum interrupter. The hollow cylindrical shield is preferably arranged centrally on the vacuum interrupter, at least over half the height of the cylindrical outer surface of the vacuum interrupter and in the axial direction of the latter. The shield can be designed as a single part or as multiple parts and is made, for example, from soft iron.

The holder is arranged on the outside of the metal shield and the vacuum interrupter and surrounds the metal shield and the vacuum interrupter at least partially coaxially. The vacuum interrupter is preferably surrounded coaxially by the holder over at least 240 degrees.

The holder furthermore has a plurality of holding elements which hold the metal shield in position relative to the vacuum interrupter.

According to at least one embodiment, the holding elements comprise at least two radially inward projecting protrusions which form a stop for a first end and a second end of the metal shield.

As a result, the metal shield is positioned on the vacuum interrupter in the axial direction of the latter, preferably centrally.

According to at least one further embodiment, at least one of the protrusions comprises a spacer which is arranged between the metal shield and the vacuum interrupter.

The spacer is designed as a wedge-shaped raised portion which is arranged radially inside on the at least one protrusion and extends in the axial direction of the vacuum interrupter. When the holder is mounted, the spacer is arranged between the shield and the vacuum interrupter and prevents the shield from bearing directly against the cylindrical outer surface of the vacuum interrupter.

According to at least one embodiment, the holding elements also comprise at least one radially inward projecting stud which projects in form-fitting fashion, i.e. so that it fits precisely, into an opening in the metal shield.

As a result, the shield is held in position and counteracts twisting of the shield relative to the vacuum interrupter.

According to at least one embodiment, the holder comprises at a first end and at a second end in each case at least one inward facing shoulder which bears in form-fitting fashion against the vacuum interrupter.

The shoulder can be formed radially on the circumference of the ends of the holder and/or be radially segmented, i.e. consisting of individual shoulders which are arranged spaced apart from one another and radially on the ends of the holder.

According to at least one embodiment, the holder comprises at the first end and at the second end in each case a plurality of radially inward extending braces which bear in form-fitting fashion against the vacuum interrupter. The holder is fixed in the axial direction of the vacuum interrupter by means of the braces.

According to at least one further embodiment, the holder consists of at least two segments which are designed in an identical fashion and each have a plurality of cross struts and longitudinal struts. The segments are preferably arranged so that they are rotated horizontally and vertically relative to each other by 180 degrees.

According to at least one further embodiment, the vacuum interrupter comprises a fastening ring which is mechanically connected to the holder in detachable fashion in such a way that the fastening ring can be pushed into the holder and can be locked therein by twisting.

The fastening ring is supported on its end side against the vacuum interrupter and fixes the holder in the axial direction of the vacuum interrupter by means of the locking mechanism.

According to the improved concept, a tap changer, in particular an on-load tap changer, is moreover provided which comprises at least one vacuum interrupter according to the improved concept.

According to at least one embodiment of the tap changer, the tap changer contains a diverter switch which comprises the vacuum interrupter, or a selector switch which comprises the vacuum interrupter.

Aspects of the present disclosure will be explained in detail below with the aid of exemplary embodiments with reference to the drawings. Components which are identical or functionally identical or have an identical effect can be provided with identical reference symbols. Identical components or components with an identical function are in some circumstances explained only with regard to the Figure in which they first appear. The explanation is not necessarily repeated in the subsequent Figures.

Figure 2:
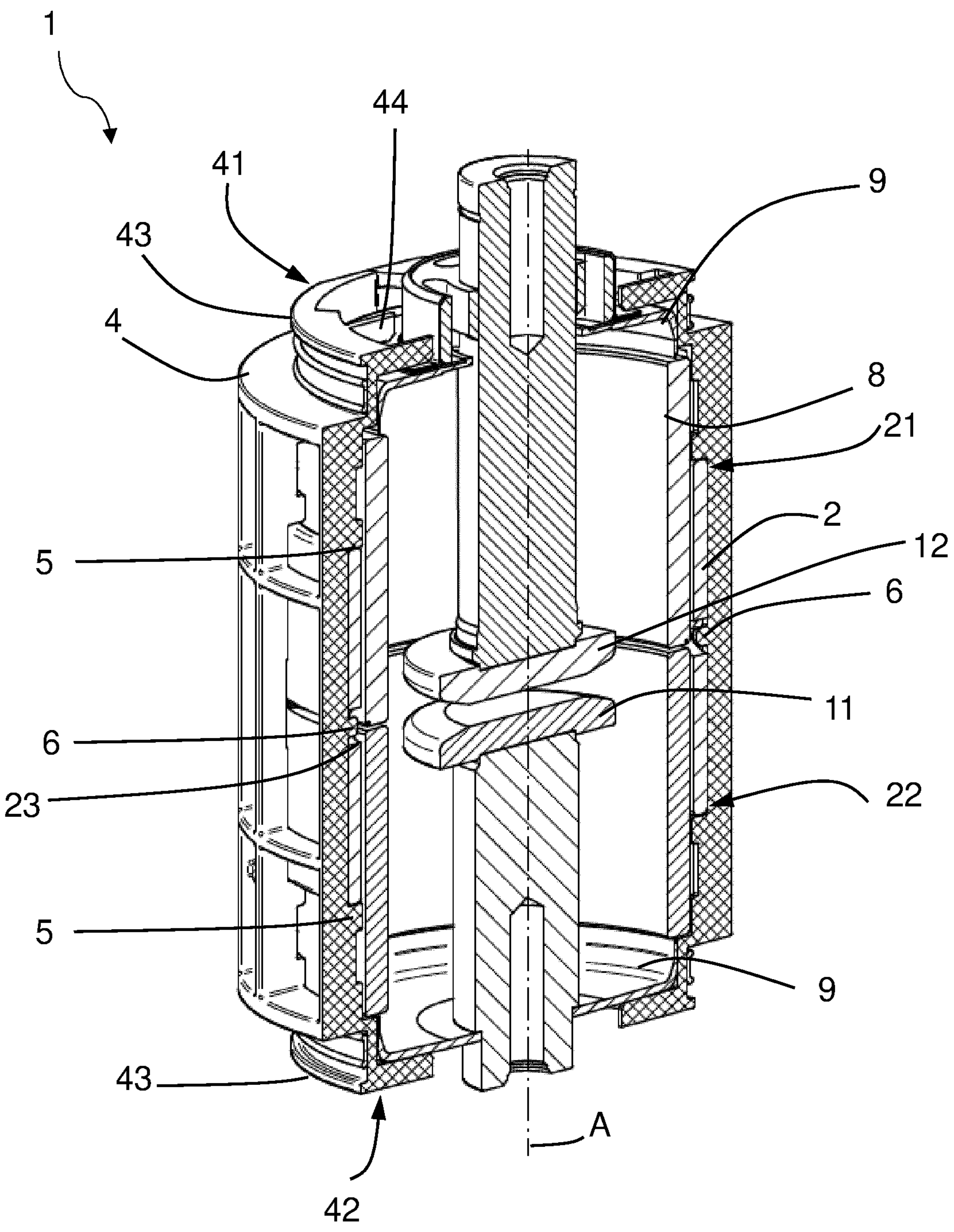
FIG. 2 shows an illustration in longitudinal section of the vacuum interrupter from FIG. 1.

FIGS. 1 and 2 show a perspective illustration and an illustration in longitudinal section of an exemplary embodiment of a vacuum interrupter according to the improved concept of the present disclosure.

The vacuum interrupter 1 has a housing with a switching chamber 8 which is made, for example, from ceramic and has two walls 9, for example made from metal, which are each arranged at the ends. The switching chamber 8 has a hollow cylindrical design and has a cylindrical outer surface. The walls 9 adjoin the ends of the switching chamber 8 and seal the latter airtightly.

The vacuum interrupter 1 has a fixed contact 11 and a contact 12 which can move axially relative to the vacuum interrupter. The contacts 11, 12 are arranged in the switching chamber 8. The vacuum interrupter 1 can be opened and closed by actuating the movable contact 12.

A hollow cylindrical, metal shield 12 is arranged around a part of the vacuum interrupter 1, to be more precise around a part of the cylindrical outer surface of the switching chamber 8, along an axis A centrally with respect to the height of the switching chamber 8.

A holder 4 surrounds the outside of the vacuum interrupter 1 and the shield 2 coaxially over approximately 240 degrees. The remainder of the vacuum interrupter 1 and the shield 2 are not affected by the holder 4.

At the first end 41 and a second end 42 of the holder 4, in each case a plurality of braces 44 are arranged which extend radially inward and, in the mounted state of the holder 4, bear in form-fitting fashion against the vacuum interrupter 1 or the end-side walls 9 and consequently fix the holder 4 with respect to the axis A.

The holder 4 consists of two segments which have an identical design and have a plurality of cross struts 13 and longitudinal struts 14. The two segments are arranged so that they are rotated horizontally and vertically relative to each other by 180 degrees.

Figure 3:
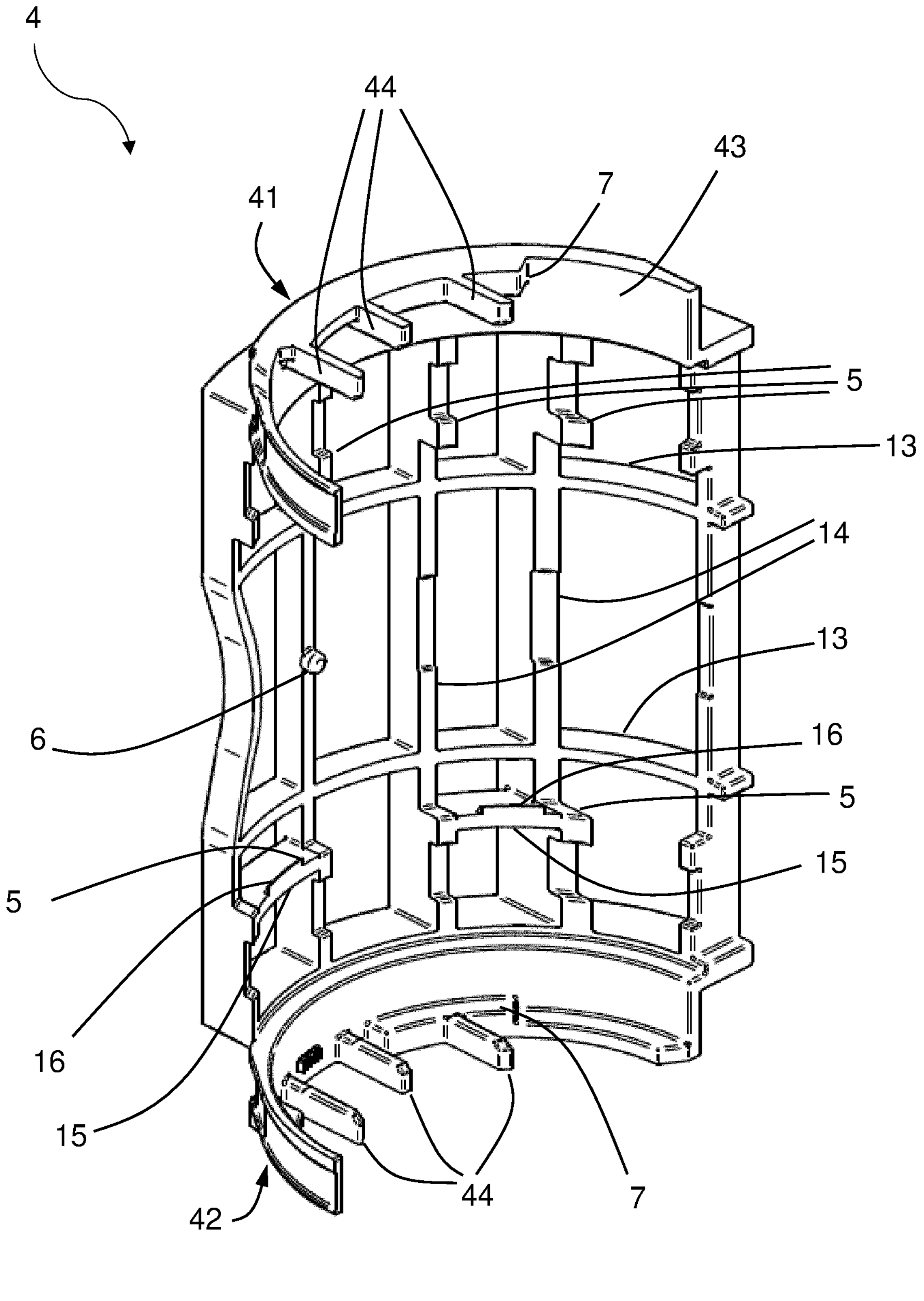
FIG. 3 shows a perspective view of an exemplary embodiment of a segment of a holder for a vacuum interrupter according to the improved concept.

FIG. 3 shows a perspective illustration of such a segment of the holder 4 in detail.

The holder 4 or the segments have holding elements by means of which they bear against the vacuum interrupter 1 or the switching chamber 8 and the walls 9, as well as against the shield 2.

A plurality of radially inward projecting protrusions 5 are arranged at the level of a first end 21 and a second end 22 of the shield 2, on the radially arranged longitudinal struts 14. They form an upper and a lower stop for the shield 2 and fix them with respect to the axis A.

Some of the adjacent protrusions 5 which are arranged at the level of the second end 22 of the shield 2 on the longitudinal struts 14 are connected to each other in such a way that additional partial struts 15 are formed. Spacers 16 are provided on the protrusions 5 which are connected to each other via partial struts 15. They are designed as wedge-shaped raised portions which extend in the axial direction of the vacuum interrupter 1, taper in the direction of the first end 41 of the holder 4, and are arranged radially on the inside of the partial struts 15 of the protrusions 5. In the mounted state of the holder 4, the wedge-shaped raised portions are arranged between the shield 2 and the vacuum interrupter 1, to be more precise the switching chamber 8, in such a way that the shield 2 does not bear directly against the cylindrical outer surface of the shield 2.

A further holding element represents a radially inward projecting stud 6 which is arranged centrally on one of the longitudinal struts 14 of the holder 4. This stud 6 interacts in form-fitting fashion with an opening 23 in the shield 2. Twisting of the shield 2 relative to the vacuum interrupter 1 is prevented as a result.

The segments of the holder 4 have in each case at the first end 41 and the second end 42 an inner collar 43 with a shoulder 7 which is arranged so that it faces radially and inward. The vacuum interrupter 1 or the end-side walls 9 of the vacuum interrupter 1 bears or bear against the shoulders 7.

In order to stabilize the holder 4 on the vacuum interrupter 1, a cable tie 17 is furthermore arranged in each case at the level of the collar 43 at the first end 41 and the second end 42 (cf FIG. 1).

Figure 4:
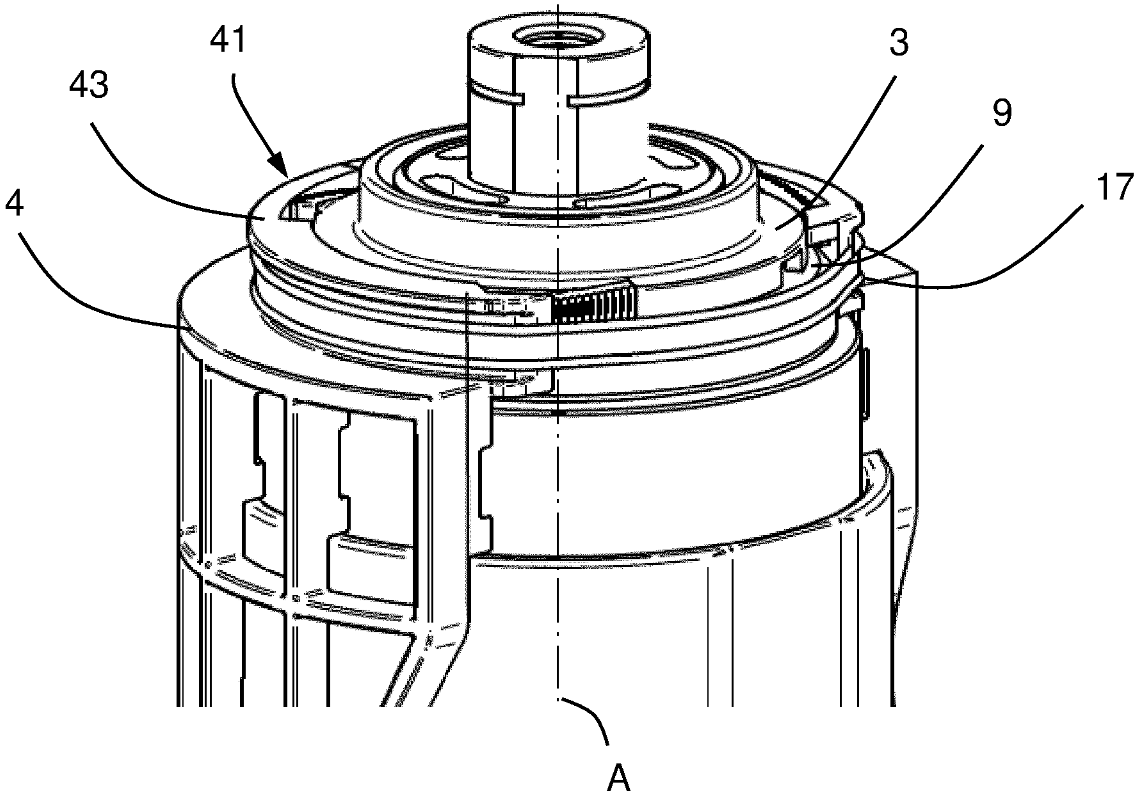
FIG. 4 shows a perspective detailed view of a further exemplary embodiment of a vacuum interrupter according to the improved concept.

FIG. 4 shows a perspective detailed view of a further exemplary embodiment of a vacuum interrupter according to an improved concept of the present disclosure.

A fastening ring 3, which is supported on the end-side wall 9 at the first end 41, is arranged at the first end 41 of the holder 4. The fastening ring 3 is mechanically connected to the holder 4 in detachable fashion using the principle of a bayonet lock in such a way that the fastening ring 3 can be pushed into the collar 43 at the first end 41 of the holder 4 and can be locked therein by twisting. The holder 4 is fixed with respect to the axis A in this way.

It is assumed that the present disclosure and many of its accompanying advantages are to be understood from the above description. It is moreover evident that various changes can be made to the shape, structure, and arrangement of the components without departing from the disclosed subject or without foregoing all the material advantages. The embodiments described are purely explanatory and such changes are encompassed by the claims below. It should furthermore be understood that the invention is defined by the claims below.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SYMBOLS

1 vacuum interrupter
2 shield
3 fastening ring
4 holder
protrusion
6 stud
7 shoulder
8 switching chamber
9 end-side wall
11 fixed contact
12 movable contact
13 cross strut
14 longitudinal strut
partial strut
16 spacer
17 cable tie
21, 22 first end and second end of 2
23 opening of 2
41, 42 first end and second end of 4
43 collar of 4
44 braces of 4

The invention claimed is:

1. A vacuum interrupter arrangement for a tap changer, the vacuum interrupter arrangement comprising:

a vacuum interrupter;

a metal shield configured to shield against external magnetic fields, the metal shield having a hollow cylindrical design and being arranged around at least a part of a cylindrical outer surface of the vacuum interrupter; and a holder, which is arranged on an outside of the metal shield and the vacuum interrupter, and which surrounds the metal shield and the vacuum interrupter at least partially coaxially, wherein the holder has a plurality of holding elements which hold the metal shield in position relative to the vacuum interrupter, and wherein the holding elements comprise at least two radially inward projecting protrusions which form a stop for a first end and a second end of the metal shield.

2. The vacuum interrupter arrangement as claimed in claim 1, wherein at least one of the protrusions has a spacer which is arranged between the metal shield and the vacuum interrupter.

3. The vacuum interrupter arrangement as claimed in claim 1, wherein the holder comprises at a first end and at a second end in each case at least one radially circumferential and/or radially segmented and inward facing shoulder which bears in form-fitting fashion against the vacuum interrupter.

4. The vacuum interrupter arrangement as claimed in claim 1, wherein the holder comprises at a first end and at a second end in each case a plurality of radially inward extending braces which bear in form-fitting fashion against the vacuum interrupter.

5. The vacuum interrupter arrangement as claimed in claim 1, wherein the holder has a plurality of cross struts and longitudinal struts.

6. The vacuum interrupter arrangement as claimed in claim 1, the vacuum interrupter furthermore comprising:

a fastening ring which is mechanically connected to the holder in detachable fashion in such a way that the fastening ring is pushable into the holder and is configured to be locked therein by twisting.

7. A tap changer comprising the vacuum interrupter arrangement as claimed in claim 1.

8. The tap changer as claimed in claim 7, wherein the tap changer has a diverter switch or a selector switch which comprises the vacuum interrupter arrangement.

9. A vacuum interrupter arrangement for a tap changer, the vacuum interrupter arrangement comprising:

a vacuum interrupter;

a metal shield configured to shield against external magnetic fields, the metal shield having a hollow cylindrical design and being arranged around at least a part of a cylindrical outer surface of the vacuum interrupter; and a holder, which is arranged on an outside of the metal shield and the vacuum interrupter, and which surrounds the metal shield and the vacuum interrupter at least partially coaxially, wherein the holder has a plurality of holding elements which hold the metal shield in position relative to the vacuum interrupter, and wherein the holding elements comprise at least one radially inward projecting stud which projects in form-fitting fashion into an opening in the metal shield.

10. A vacuum interrupter arrangement for a tap changer, the vacuum interrupter arrangement comprising:

a vacuum interrupter;

a metal shield configured to shield against external magnetic fields, the metal shield having a hollow cylindrical design and being arranged around at least a part of a cylindrical outer surface of the vacuum interrupter;

a holder, which is arranged on an outside of the metal shield and the vacuum interrupter, and which surrounds the metal shield and the vacuum interrupter at least partially coaxially; and a fastening ring which is mechanically connected to the holder in detachable fashion in such a way that the fastening ring is pushable into the holder and is configured to be locked therein by twisting, wherein the holder has a plurality of holding elements which hold the metal shield in position relative to the vacuum interrupter.

* * * * *